United States Patent [19]

Trott et al.

[11] 4,196,859
[45] Apr. 8, 1980

[54] SPREADER CONTROL

[75] Inventors: Clarence R. Trott, Welland; Gerardus A. Veldhoven, St. Catharines; Rory Rae, Wainfleet, all of Canada

[73] Assignee: Deere & Company, Moline, Ill.

[21] Appl. No.: 894,206

[22] Filed: Apr. 6, 1978

[51] Int. Cl.² ............................................. A01C 17/00
[52] U.S. Cl. .................................... 239/677; 239/684; 74/11; 74/15.2; 74/142; 74/217 S
[58] Field of Search .................... 239/670, 677, 684; 74/11, 15.2, 15.4, 217 S, 142

[56] References Cited
U.S. PATENT DOCUMENTS

| | | | |
|---|---|---|---|
| 2,342,837 | 2/1944 | Brown | 239/670 X |
| 3,232,626 | 2/1966 | Polzin | 239/677 X |
| 3,583,242 | 6/1971 | Thornbloom | 239/677 |
| 3,722,307 | 3/1973 | Campbell | 74/11 |

FOREIGN PATENT DOCUMENTS 1550656  1/1966  Fed. Rep. of Germany ......... 74/217 S

OTHER PUBLICATIONS

Operators Manual, Manure Spreader 513-519-679 Sperry-New Holland, Mar.1978.
Box Spreaders, 213, 328, 513, 519, 679, 791, Sperry-New Holland, Feb. 1978.

Primary Examiner—Robert W. Saifer

[57] ABSTRACT

A material unloader having a conveyor and a distributing unit includes a control assembly operative from the tractor or towing vehicle by a single hydraulic control. A jaw clutch is provided for engaging and disengaging the distributing unit drive and the power shaft. A variable speed pulley assembly is operable to engage and disengage the conveyor drive and power shaft and to vary the speed of the conveyor over a wide range of values. The jaw clutch and variable speed pulley assembly are simultaneously controlled by a cam operated shifter assembly. The cam is mounted on a control shaft along with a pawl and ratchet mechanism indexed by a hydraulic cylinder to sequentially establish various combinations of conveyor and distributing unit drive conditions, including a condition wherein the distributing unit is disengaged and the conveyor is operating at a relatively high speed for fast cleanout of the unloader.

18 Claims, 10 Drawing Figures

SPREADER CONTROL

BACKGROUND OF THE INVENTION

The present invention relates to material unloading devices and more particularly relates to devices of the type including a variable-speed unloading conveyor and a distributing unit.

Material unloaders such as manure spreaders commonly include a box or the like having a conveyor to move material at various selected rates to the rear of the box to the distributing unit or beaters. The conveyor and the distributing unit are often powered by the same drive source which, in the case of a towed device, usually is the power takeoff shaft of a tractor.

The above-mentioned material unloaders normally employ a ratchet wheel and pawl mechanism, a worm gear drive or various multiple clutch arrangements or the like to drive the conveyor at selectively variable speeds. Since a ratchet wheel and pawl mechanism is easy to shift, a rope control often is used to vary the conveyor drive speed. However, such a mechanism is relatively complex and includes intermittently operating parts subject to considerable wear. The worm gear or multiple clutch drive arrangements, although possessing several advantages over the ratchet and pawl system, usually have to be shifted while under load and therefore a rope control is difficult for the operator to manipulate properly from his position on the tractor seat. Often the rope control requires much effort to operate or is too easily movable to an undesired setting, giving the wrong combination of unloader conveyor speed and distributing unit operation. Some of the units have one control for the beaters and another for the conveyor adding to the difficulty. Additionally, the various arrangements generally do not provide a sufficient range of conveyor speeds, especially a very high conveyor speed to quickly clean out the box. In cold weather the box can freeze up if not cleaned promptly, locking the conveyor and preventing use of the unloader. Because of the relatively slow conveyor cleanout speed, the operator commonly will not wait the necessary time to achieve an adequate cleaning.

SUMMARY OF THE INVENTION

An object of the present invention is to provide an improved single control for engaging and disengaging the conveyor and distributing unit and for varying the speed of the conveyor drive.

Another object of the invention is to provide a control which is easily and conveniently operated with little effort on the part of the operator. The control provides reliable sequential setting of proper conveyor speed and distributing unit operation combinations using a single actuator.

A further object is to provide an easily adjustable, non-intermittent type variable speed conveyor drive mechanism which is operated in combination with a distributing unit clutch by a single control assembly.

An additional object is to provide a variable speed conveyor drive having a very high speed for quick cleanout.

Another object of the invention is to provide a control with an indexing mechanism to establish reliably in sequence a plurality of conveyor-distributing unit operative conditions. The control includes a hydraulic cylinder activated from the tractor.

An additional object of the invention is to provide a control with a single cam operated shift assembly to smoothly engage and disengage both the conveyor and distributing unit and to vary the speed of a conveyor belt drive over a wide range of values.

These and other objects will become apparent from the following description and the appended drawings.

DESCRIPTION OF THE PREFERRED EMBODIMENT

Figure 1:
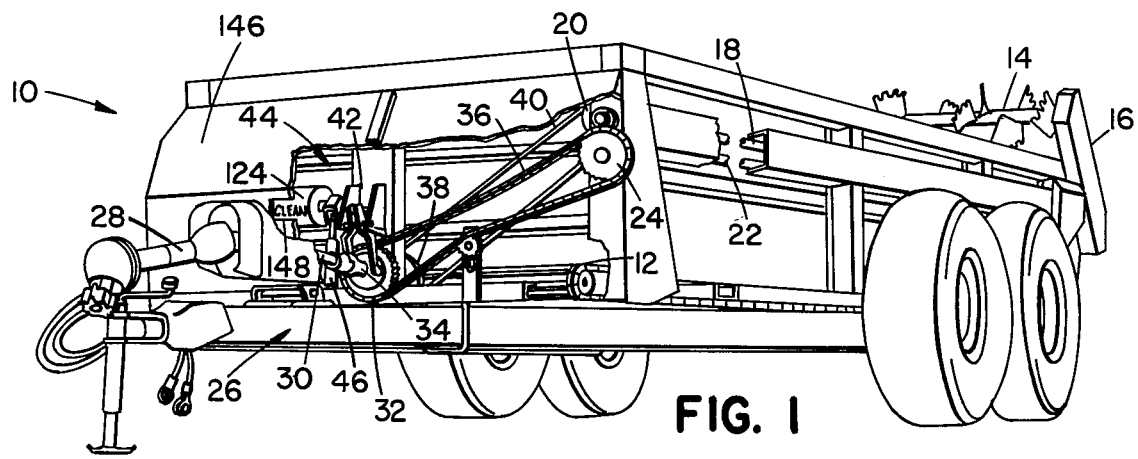
FIG. 1 is a perspective view of the unloading device partially cut away to show the drive and control for the conveyor and distributing unit.
Figure 2:
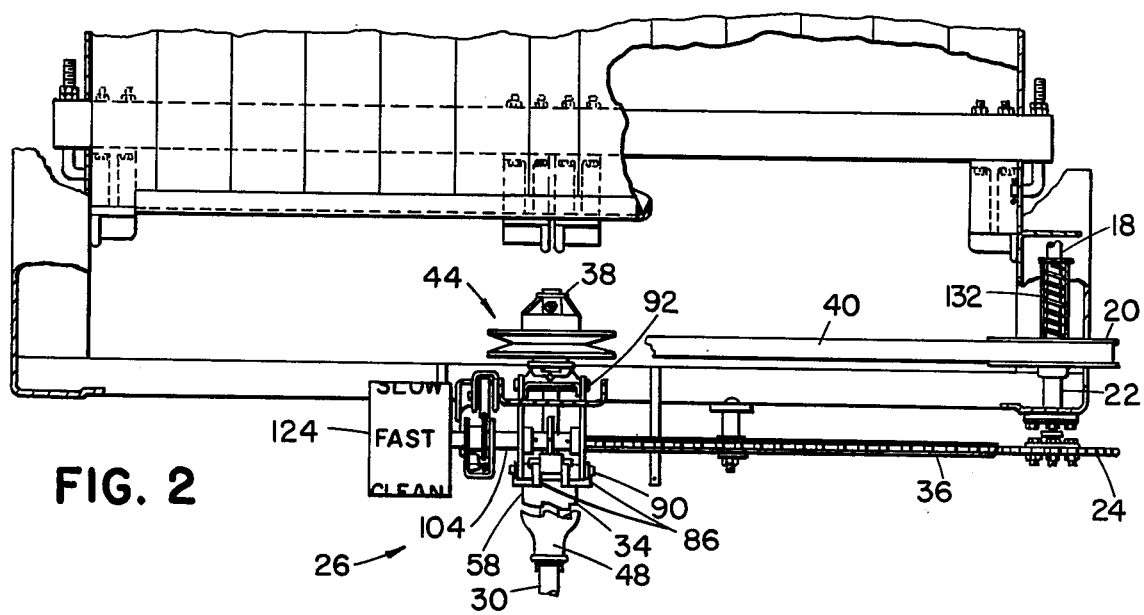
FIG. 2 is an enlarged partial top view of the front of the unloader showing the drive and control.
Figure 3:
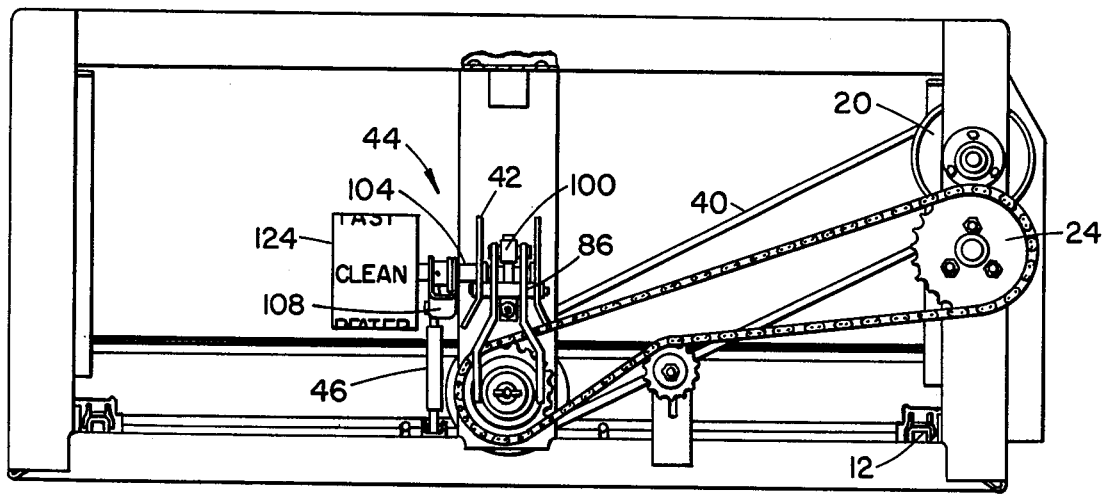
FIG. 3 is a front view of the drive and control.

Referring to FIG. 1, there is shown a material unloading device or spreader 10 including a conveyor 12 and a distributing or beater unit 14. The beaters and conveyor are driven by gear mechanisms located in housing 16 near the rear of the spreader. A conveyor drive 18 extends from the rear gear housing to the front of the spreader and includes a pulley 20. A distributor unit drive 22 with sprocket 24 is similarly positioned.

The conveyor and distributor drives are operated and controlled by a mechanism indicated generally at 26 driven by a power shaft 28 extending to the tractor PTO (not shown). A main drive shaft 30 connected to the power shaft 28 drives sprocket 32 through an engageable and disengageable jaw clutch or coupling 34. Chain 36 connects sprocket 34 with distributor drive sprocket 24. A pulley 38, mounted on an extension of shaft 30 for rotation therewith, is adjustable to variably engage and to disengage a belt 40 which drives conveyor pulley 20.

Mounted on a support 42 is a control assembly 44, later to be set forth in detail, for operating clutch 34 and adjustable pulley 38. Hydraulic cylinder 46 is provided for indexing and shifting the assembly from the tractor to establish various combinations of beater and conveyor drive operating conditions.

As best seen in FIGS. 2 and 4–8, a jaw clutch 34 having a first member 48 is keyed to shaft 30. Spring pin 50, washer 52, cap 54, and spacers 56 bear against and prevent forward axial movement of member 48. A second jaw clutch member 58 which mates with member 48 is splined to a sprocket hub 60 rotatably mounted on shaft 30 by bearing members 62. Sprocket 32 is connected to hub 60 which, along with bearing members 62, a collar member 64 and spacers 66, prevents member 48 from axially shifting to the right. A spring 68 positioned about hub 60 between sprocket 32 and clutch member 58 urges the member 58 to the left into engagement with the mating clutch member 48.

Figure 10:
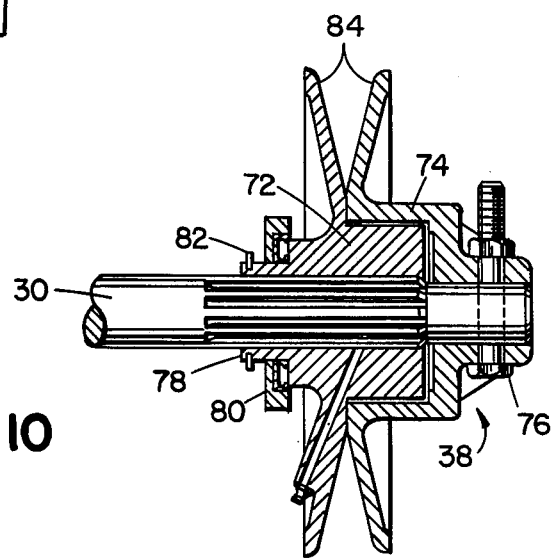
FIG. 10 is a sectional view of the adjustable pulley.

Main drive shaft 30 extends through shaft support bearing 70 mounted on the support and carries adjustable pulley 38. The pulley 38 (FIG. 10) includes a front half 72 splined to shaft 30 and a rear half 74 pinned to the shaft by bolt 76. Front half 72 can be shifted axially on shaft 30 and includes a hub 78 supporting a thrust bearing assembly 80. A snap ring 83 prevents assembly 80 from slipping off the hub. Each half includes an inclined belt receiving portion 84 allowing the belt 40 to ride higher on the pulley 38 as the relative axial displacement between the halves decreases and to ride lower on the pulley as displacement increases, as is conventional in a variable speed pulley.

Control assembly 44, as shown in FIGS. 2–7, includes shifter forks 86 and 88 pivotally mounted on support 42 by pins 90 and 92, respectively. A bolt 94 (shown in FIG. 4) is threaded through trunnion 96 of fork 86 and includes an extension 95 of reduced diameter which extends through a hole in plate 98 on shifter or fork 88. The extension 95 includes a hole for receiving a pin, or other suitable means, for preventing axial displacement of the bolt 94 so that fork 86 and fork 88 pivot simultaneously. Mounted on one of the forks, in this case near the top of fork 86 above pivot 90, is a roller or cam follower member 100. A cam 102 mounted on control shaft 104 contacts the roller 100 to pivot the shifter forks 86 and 88. Since fork 86 is connected to bolt 94 near pivot 90 and fork 88 is connected to the bolt at a considerably larger distance from its pivot 92, end 126 will pivot through a larger arc than end 130 as the forks are pivoted.

Figure 9:
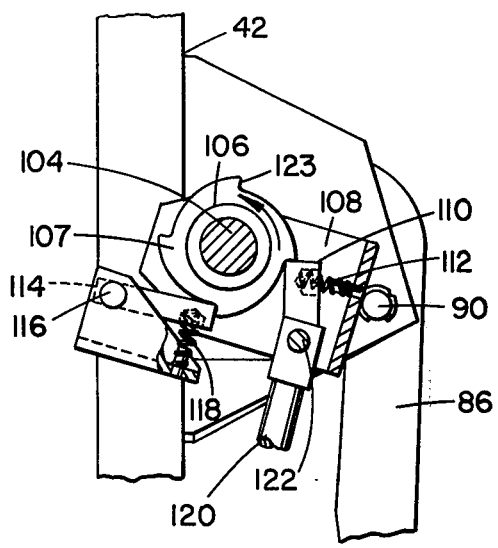
FIG. 9 is an enlarged end view partially in section of the indexing mechanism.

Also mounted on control shaft 104 for rotation therewith is a ratchet wheel 106 (FIG. 9) with four teeth 107 spaced equally around its circumference. A U-shaped bracket 108 is mounted for pivoting about the shaft 104. A pawl 110, supported by the bracket 108, is biased toward engagement with the ratchet 106 by spring 112. A locking dog 114 is pivotably mounted on support 42 by pin 116 and is biased toward engagement with the ratchet by spring 118. Bracket 108 with pawl assembly 110 is connected to rod 120 of hydraulic cylinder 46 by pin 122 so that the pawl 110 contacts shoulder 123 of one of the teeth 107 and rotates the ratchet 106 in the counterclockwise direction as viewed in FIG. 9 when the hydraulic cylinder is extended. As the cylinder 46 is retracted and bracket 108 pivots to the position shown in FIG. 9, dog 114 abuts against the adjacent shoulder 123 and prevents clockwise rotation of ratchet 106.

Mounted on the control shaft 104 is an indicator 124 (FIGS. 1–3) which rotates with cam 102 and ratchet 106. As control shaft 104 with cam 102 is indexed by the ratchet and pawl assembly, indicia spaced equidistant about the indicator 124 is correspondingly presented in the direction of the operator for indicating the operative condition of the control assembly 44, as will be discussed in detail below.

Figure 7:
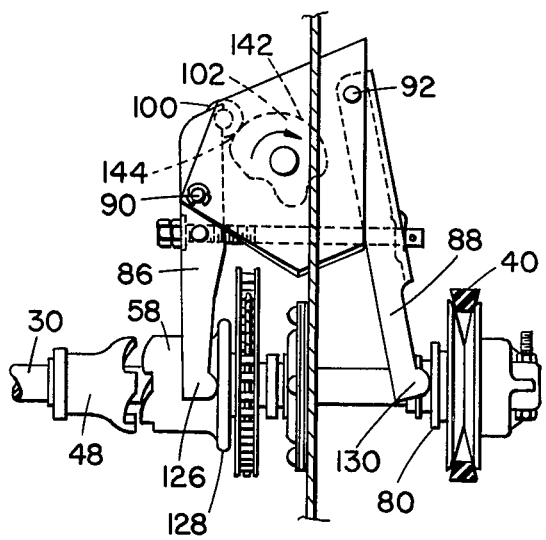
FIG. 7 is a view similar to FIG. 6 but showing the distributor unit drive disengaged and the pulley adjusted for operating the conveyor at a high speed.
Figure 8:
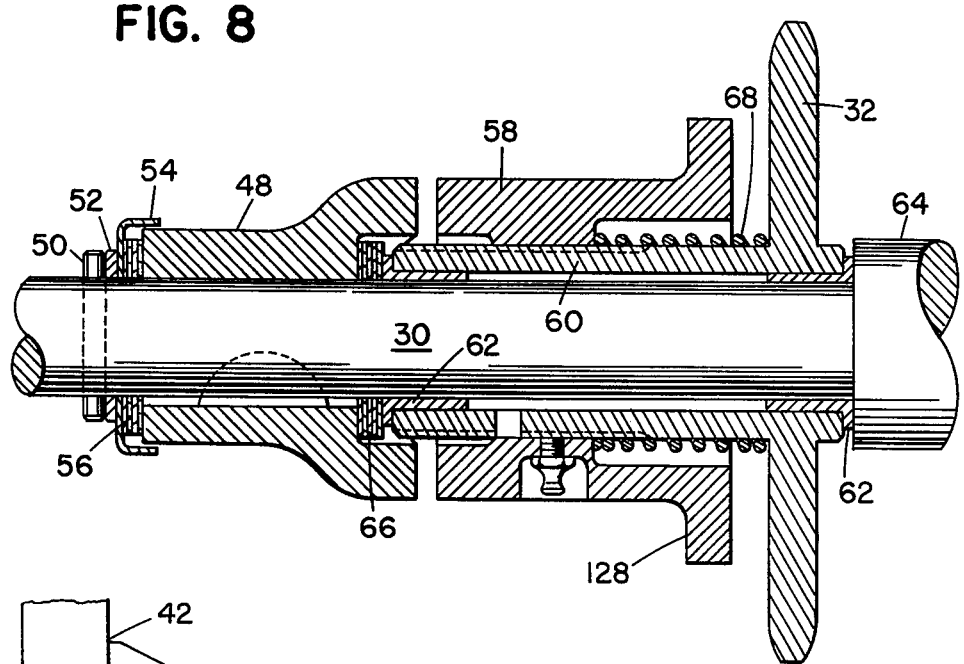
FIG. 8 is an enlarged side view partially in section of the jaw clutch for the distributor unit drive.

Fork 86 includes rounded end portions 126 for contacting flange 128 of jaw clutch member 58 as the fork is pivoted by the cam 102 to the position shown in FIG. 7. Similarly, shifter 88 includes rounded end portions 130 for contacting thrust bearing 80 to urge front half 72 of pulley 38 to the right from the position shown in FIG. 4 stepwise to the position shown in FIG. 7 as the cam 102 is indexed and the shifter pivots with fork 86.

A belt 40 is trained between adjustable pulley 38 and conveyor drive pulley 20. Pulley 20 is split similarly to pulley 38, but a spring 132 (FIG. 2) biases the rear half into contact with the front half when belt 40 rides low on pulley 38. As pulley half 72 is shifted closer to half 74, belt 40 rides higher on pulley 38 increasing the tension of the belt to pull it further between the halves of pulley 20, extending the halves with respect to each other and compressing spring 132. Therefore, the effective diameter of pulley 38 increases and the effective diameter of pulley 20 decreases as the axial displacement of pulley halves 72 and 74 is decreased by rocking shifter 88 counterclockwise about its pivot 92. The tension of belt 40 acting on the inclined surfaces 84 of pulley biases front half 72 to the left as viewed in FIGS. 4–7 urging thrust bearing 80 against end portion 130 of shifter 88. This bias, imparted to fork 86 through connector 94, maintains roller member 100 in contact with cam 102.

Figure 4:
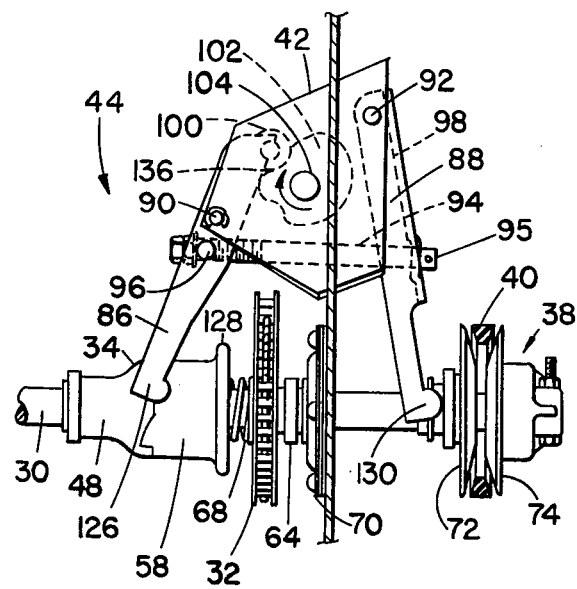
FIG. 4 is a side view of the drive and control showing the distributor unit drive engaged and the unloading conveyor drive disengaged.
Figure 5:
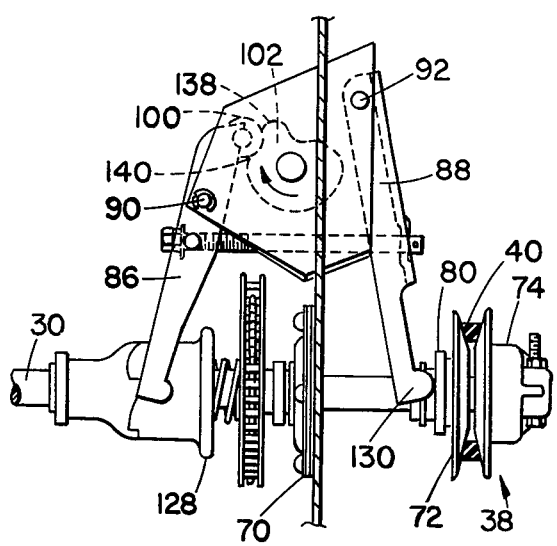
FIG. 5 is a view similar to FIG. 4 but showing the conveyor drive engaged with the pulley adjusted for operating the conveyor at a low speed.

In operation, the unloading device 10 is hitched to a towing vehicle, such as a tractor, and the power shaft 28 is connected to the power takeoff shaft of the tractor. The hoses for the hydraulic cylinder 46 are connected to the vehicle's hydraulic control system. Before engaging the power shaft of the towing vehicle to rotate main drive shaft 30, the drive 22 to the beaters is engaged and the drive 18 to the conveyor 12 is disengaged by operating the cylinder 46 to extend and retract cylinder rod 120 and index ratchet 106 until cam 102, connected to ratchet 106 through shaft 104, is positioned as shown in FIG. 4. This position is evidenced to the operator by indicia "BEATERS" on the forward face of indicator 124, which also rotates with shaft 104. In this position roller 100 is positioned in the cam surface section 136 of the cam's smallest radius. Fork 86 is thus pivoted with portion 126 far removed from flange 128 so that jaw clutch 34 is engaged. Shifter 88 is pivoted to its extreme clockwise position by connector 94 allowing front half 72 of pulley 38 to shift axially away from half 74 sufficiently so that belt 40 is not engaged by the pulley. The operator then engages the power takeoff shaft on the tractor which drives shaft 30 to thereby impart torque to sprocket 32 through jaw clutch 34. The sprocket 32, as mentioned previously, drives the beaters 14.

To engage the drive to conveyor 12, the operator activates the hydraulic control extending rod 120 of hydraulic cylinder 46 to pivot bracket 108 (FIG. 9) and pawl 110. Each extension of rod 120 rotates ratchet 106 one-quarter turn. Dog 114 maintains the ratchet in the new position as the bracket assembly is returned to its starting position by retracting rod 120. Cam 102, rotating with the ratchet 106, is thus indexed in the position shown in FIG. 5 with indicator 124 correspondingly indexed to present the indicia "SLOW" to the operator. As the cam 102 moves to this second position roller 100 passes over a section 138 of the cam of increased radius to shift the forks 86 and 88 fairly abruptly to the right so that end portion 130 urges thrust bearing 80 and front pulley half 72 to the right to positively engage the pulley with belt 40 and drive the conveyor. As cam 102 reaches the indexed position, roller 100 recedes somewhat into an area 140 of the cam reduced in radius from that of section 138 but sufficiently increased in radius over section 136 to maintain forks 86 and 88 in a second position wherein belt 40 is engaged by pulley 38. The belt 40 rides low within the sides of the pulley and therefore is driven relatively slowly to operate the conveyor 12 at the low speed. Jaw clutch 34 remains engaged since end 126 of fork 86 has not shifted sufficiently to engage flange 128.

Figure 6:
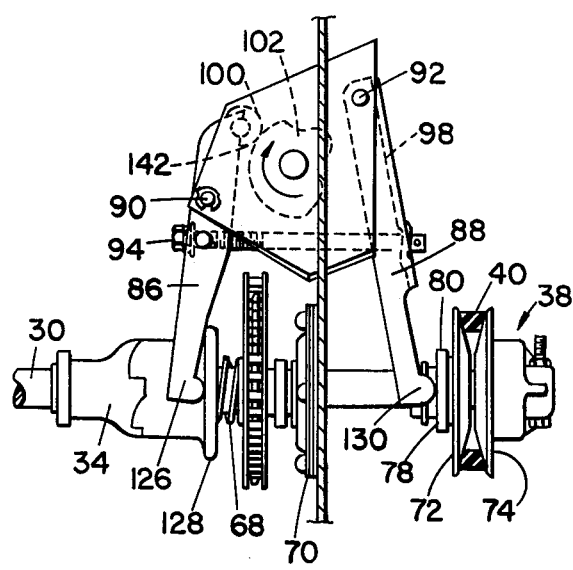
FIG. 6 is a view similar to FIG. 5 but with the pulley adjusted for operating the conveyor at a medium speed.

If the operator desires to increase the conveyor speed while the beaters remain in operation, he activates the hydraulic cylinder 46 to shift ratchet wheel 106 another one-quarter turn so that the cam 102 is positioned as shown in FIG. 6. The increased speed is evidenced to him by the indicia "FAST" on indicator 124 which rotates with the ratchet wheel and cam on shaft 104. Roller 100 is positioned on area 142 of increased radius as compared with area 140. This rocks the forks 86 and 88 counterclockwise about their pivots, positioning end portion 126 near flange 128, but without disengaging clutch 34, and positioning end portion 130 to urge thrust bearing assembly 80 and thus pulley half 72 to the right. This causes belt 40 to ride higher on pulley 38 to increase the speed of the belt and, correspondingly, the speed of the conveyor drive.

When a small amount of material remains in the spreader 10 so that the beaters 14 no longer contact the material, it is desirable to disengage the beaters and increase the speed of the conveyor 12. This is done by activating the cylinder 46 to extend rod 120 and index the cam 102 to the position shown in FIG. 7. This indexes the indicator 124 to present the indicia "CLEAN" to the operator. The radius of the cam 102 gradually increases from area 142 to area 144 smoothly pivoting fork 86 counterclockwise about pivot 90 as the cam is rotated in the clockwise direction from the position shown in FIG. 6. End portion 126 contacts flange 128 urging jaw clutch member 58 against the bias of spring 68 and out of contact with clutch member 48 to disengage the drive to sprocket 32. Simultaneously shifter 88 pivots to further decrease the axial spacing of pulley halves 72 and 74 causing belt 40 to ride near the outside of the pulley and increase the belt speed and thus the speed of the conveyor drive. Of course, as belt 40 rides higher on pulley 38, increased tension in the belt tends to pull it between the halves of conveyor drive pulley 20 to accentuate the belt speed changes. When the spreader 10 is sufficiently cleaned, the operator disengages the power takeoff shaft on the tractor. Upon reloading the unloading device 10, the indexing sequence is repeated, beginning with the control assembly positioned as shown in FIG. 4 after which the power takeoff is again engaged to operate the beaters.

It can be appreciated that complete, easy and smooth control of the spreader operation takes place from the tractor or towing vehicle cab and that a wide range of conveyor operating speeds, including a high speed for cleanout, as well as clutching of the drives are achieved without ropes using a single shifter assembly indexed by a hydraulic cylinder. Since the indexing is sequential the operator is precluded from inadvertently skipping a desired setting as he operates the controls.

Relative adjustment of the forks 86 and 88 to compensate for wear is easily achieved by rotating bolt 94 for extending or retracting it within trunnion 96 (FIG. 4). Jaw clutch member 48 is adjustable with respect to member 58 by simply rearranging spacers 56 and 66 (FIG. 8) for proper clearance of the members 48 and 58 when in the position shown in FIG. 7.

Shielding 146 (FIG. 1) is provided for the front of spreader 10 to enclose the drive and control assembly. A slot 148 allows the operator to view the indicia on indicator 124 to determine the operative condition of the assembly.

We claim:

1. Means for driving and controlling the operation of a material unloader conveyor and distributor including a drive shaft and conveyor and distributor drives comprising:

first controllably engageable and disengageable drive coupling means connected between the drive shaft and the distributor drive;

controllably engageable and disengageable variable speed belt drive means connected between the drive shaft and the conveyor drive and adjustable to operate the conveyor drive at a low, a medium and a high speed; and means for simultaneously controlling the drive coupling means and belt drive means for sequentially establishing:

a first operative condition wherein the first drive coupling means is engaged and the belt drive means is disengaged, a second operative condition wherein the first drive coupling means and the belt drive means are engaged and the belt drive means is adjusted to operate at the low speed, a third operative condition wherein the first drive coupling means and belt drive means are engaged, and the belt drive means is adjusted to operate at the medium speed, and a fourth operative condition wherein the first drive coupling means is disengaged, and the belt drive means is adjusted to operate at the high speed, said means for controlling including a shiftable fork assembly for contacting the drive coupling means and belt drive means to establish the operative conditions, and a hydraulically controlled multiple position cam member for shifting the fork assembly.

2. The invention defined in claim 1 wherein the means for controlling further comprises indexing means connected to the cam member.

3. The invention defined in claim 1 wherein the belt drive means includes effective diameter variable pulley means to adjust the belt drive means speed.

4. The invention defined in claim 1 wherein the first drive coupling means comprises a jaw clutch member having a first section mounted for rotation with the drive shaft, a second section connected to the distributor drive, and biasing means urging the second section into contact with the first section, the fork assembly urging the second section out of contact with the first during the fourth operative condition.

5. A mechanism for engaging and disengaging a drive shaft and unloader and distributor drives and for varying the speed of the unloader drive comprising:

a support;

shiftable coupling means for engaging and disengaging the drive shaft and the distributor drive;

means for biasing the coupling means toward a normally engaged position;

variable speed belt drive means including a first pulley having two halves shiftably mounted for axial displacement with respect to each other on the drive shaft for changing the effective diameter of the first pulley to increase or decrease the speed of the belt drive means as the displacement is respectively decreased or increased and for engaging and disengaging the unloader drive, an unloader drive pulley connected to the unloader drive, and belt trained between the pulley halves and the unloader drive pulley;

a variable position shifter assembly rockably mounted on the support for operating the coupling means and varying the displacement of the pulley halves with respect to each other;

a multiple position cam member mounted on the support for rocking the shifter assembly, the cam member having at least four positions to vary the shifter assembly position including a first position to increase the displacement of the pulley halves for disengagement of the unloader drive, a second position to decrease the displacement to engage the unloader drive, a third position to further decrease the displacement, and a fourth position to shift the coupling means against the bias to the disengaged position; and means for positioning the cam member.

6. The invention defined in claim 5 wherein in the fourth position the displacement is further decreased from that in the third position.

7. The invention defined in claim 5 wherein the multiple position member comprises a rotatable cam member for contacting the shifter assembly and a ratchet and pawl assembly connected to the cam member.

8. The invention defined in claim 7 wherein the multiple position cam member further includes a support shaft extending transversely to the drive shaft for mounting the rotatable cam member on the support, and wherein the ratchet and pawl assembly includes a ratchet fixed to rotate with the support shaft, and a pawl arm rockably mounted on the support shaft and engageable with the teeth of the ratchet.

9. The invention defined in claim 8 wherein the means for positioning the cam member comprises a hydraulic cylinder connected between the support and the pawl arm.

10. The invention defined in claim 5 wherein the means for positioning the member comprises a hydraulic cylinder.

11. The invention defined in claim 5 wherein the shifter assembly includes a first fork pivotably mounted on the support and having a coupling means contacting portion for urging the coupling means out of the normally engaged position when the multiple position member is in the fourth position, a second fork pivotably mounted on the support and operably connected to one half of the first pulley, and link means connecting the two forks for simultaneous pivoting of the forks.

12. The invention defined in claim 11 wherein the shifter assembly further comprises roller means mounted on one of the forks and wherein the multiple position member includes cam means for contacting the roller to rock the shifter assembly.

13. The invention defined in claim 5 wherein the shiftable coupling means comprises a normally engaged jaw clutch member including a first jaw member connected for rotation with the drive shaft, a second jaw member freely rotatably mounted on the drive shaft and slidable thereon for mating engagement with the first member, and means drivingly connecting the second jaw member and the distributor drive.

14. In a material unloader including a box-like structure with a forwardly facing wall, an unloader conveyor and a distributor, and also including a drive shaft and conveyor and distributor drives, means for driving and controlling the operation of the conveyor and distributor comprising:

controllably engageable and disengageable drive coupling means located forwardly of the wall and connected between the drive shaft and the distributor drive;

controllably engageable and disengageable variable speed belt drive means adjacent the drive coupling means and connected between the drive shaft and the conveyor drive and adjustable to operate the conveyor drive over a range of speeds between a first speed and a second speed;

means for simultaneously controlling the drive coupling means and belt drive means for establishing a plurality of operative conditions including a first operative condition wherein the first drive coupling means is engaged and the belt drive means is disengaged, a second operative condition wherein the first drive coupling means and the belt drive means are engaged and the belt drive means is adjusted to operate at the first speed, a third condition wherein the first drive coupling means and the belt drive means are engaged and the belt drive means is adjusted to operate at a speed between the first and the second speeds, and a fourth condition wherein the first drive coupling means is disengaged and the belt drive means is adjusted to operate at the second speed, the means for simultaneously controlling including a support shaft offset from the drive shaft, means for rotatably indexing the shaft, a cam mounted on the shaft to rotate therewith, an arm assembly controllably connected to the drive coupling means and the belt drive means, and a cam follower connected to the arm assembly for moving the latter in response to rotation of the cam.

15. The invention defined in claim 14 wherein the means for simultaneously controlling further includes a ratchet fixed to rotate with the support shaft, a pawl arm rockably mounted on the support shaft and having a pawl mounted thereon and engageable with the teeth of the ratchet, and a hydraulic cylinder having one end anchored against movement and the other end connected to the pawl arm for reciprocating the latter upon extension and retraction of the cylinder.

16. In a material unloader having a box-like structure with forward and side walls, a drive shaft, an unloading conveyor, and a material distributor, means for selectively engaging and disengaging the drive shaft and the conveyor and distributor and for varying the speed of the conveyor within preselected range of speeds, comprising:

controllably engageable and disengageable variable speed drive coupling means connected between the drive shaft and the unloading conveyor;

engageable and disengageable clutch means for selectively connecting and disconnecting the drive shaft and the distributor;

means for simultaneously controlling the drive coupling means and the clutch means for establishing a plurality of operative conditions including a first operative condition wherein the clutch means is engaged and the drive coupling means is disengaged, a second operative condition wherein the clutch means is engaged and the drive coupling means is engaged and operating the unloading conveyor at a first speed within the preselected range, a third operative condition wherein the clutch means is engaged and the drive coupling means is engaged and operating the unloading conveyor at a second speed within the preselected range, and a fourth operative condition wherein the clutch means is disengaged and the drive coupling means is engaged to operate the unloading conveyor at a preselected speed within the range, said means for simultaneously controlling including a control shaft supported for rotation near the forward wall, cam mounted on the control shaft for rotation therewith, cam follower means operably engaging the cam means, lever means operably associated with the clutch means and the drive coupling means, means connecting the lever means and the cam follower means, and indexing means for selectively rotating the control shaft, the indexing means comprising a ratchet connected for rotation with the shaft, a rockable pawl mounted for engagement with the rotation of the ratchet, and a hydraulic cylinder having one end anchored against movement and the other end operably connected to the pawl for rocking the latter upon extension and retraction of the cylinder.

17. The invention defined in claim 16 wherein the indexing means further comprises a pawl arm pivotally connected to the control shaft and carrying the pawl, and wherein the hydraulic cylinder is connected to the pawl arm.

18. The invention defined in claim 17 further comprising indicator means mounted on the control shaft for indicating the established operative condition.

* * * * *

UNITED STATES PATENT OFFICE
CERTIFICATE OF CORRECTION

Patent No. 4,196,859           Dated   8 April 1980

Inventor(s)   Clarence R. Trott, Gerardus A. Veldhoven and Rory Rae

It is certified that error appears in the above-identified patent and that said Letters Patent are hereby corrected as shown below:

Column 8, line 47, after "within" insert -- a --.

Column 10, line 1, delete "the" first occurance and insert -- and --.

Signed and Sealed this

Fifth Day of May 1981

[SEAL]

*Attest:*

RENE D. TEGTMEYER

*Attesting Officer*       *Acting Commissioner of Patents and Trademarks*